United States Patent [19]

McCarty et al.

[11] 4,404,055

[45] Sep. 13, 1983

[54] ELASTOMERIC SEAL

[75] Inventors: Fred B. McCarty, San Pedro; Christopher M. Gibson, Fountain Valley, both of Calif.

[73] Assignee: The United States of America as represented by the Secretary of the Air Force, Washington, D.C.

[21] Appl. No.: 259,761

[22] Filed: Apr. 30, 1981

[51] Int. Cl.³ .................... B65C 3/26; B29C 17/04; H02K 1/12; B05D 1/18

[52] U.S. Cl. .................... 156/156; 156/165; 156/215; 156/287; 156/289; 156/294; 156/239; 427/443.2; 264/573; 310/258

[58] Field of Search ............. 427/340, 412.5, 443, 427/443.2, 444, 430.1, 104, 346; 156/156, 245, 231, 215, 239, 287, 165, 242, 249, 289, 294, 293, 307.3, 344, 213; 310/259, 258, 45, 43, 42, 156; 264/516, 573, 269, 271.1, DIG. 50

[56] References Cited

U.S. PATENT DOCUMENTS

| | | | |
|---|---|---|---|
| 2,400,576 | 5/1946 | Sigmund et al. | 310/45 |
| 2,572,515 | 10/1951 | Poole et al. | 427/346 |
| 2,749,456 | 6/1956 | Luenberger | 310/43 |
| 2,761,985 | 9/1956 | Schaefer | 310/45 |
| 2,965,776 | 12/1960 | Bluth et al. | 427/104 |
| 3,025,188 | 3/1962 | Larsh et al. | 427/104 |
| 3,033,730 | 5/1962 | Martin | 156/165 |
| 3,436,811 | 4/1969 | Dundas et al. | 310/43 |
| 3,646,374 | 2/1972 | Jordan et al. | 310/45 |
| 3,691,512 | 9/1972 | Exner | 427/443.2 |
| 3,773,593 | 11/1973 | Casadevall et al. | 156/287 |
| 3,828,212 | 8/1974 | Harkness | 310/156 |
| 3,933,554 | 1/1976 | Torghele | 156/156 |
| 4,005,234 | 1/1977 | Stroupe | 156/245 |
| 4,034,455 | 7/1977 | Arakelov et al. | 156/239 |
| 4,126,933 | 11/1978 | Anderson | 310/42 |
| 4,282,905 | 8/1981 | Dopkin | 156/287 |

*Primary Examiner*—William A. Powell
*Assistant Examiner*—Louis Falasco
*Attorney, Agent, or Firm*—Donald J. Singer; Jacob N. Erlich; Frank J. Lamattina

[57] ABSTRACT

An elastomeric bore seal, and a method of making and installing it. The seal is a fluid-impervious, thin-walled (0.025 inch), open-ended, cylinder-like member which is made of an expansible material that can withstand a wide range of temperatures (−65° F. to +400° F.) and that is to be bonded and thereby installed. The use of the seal is as a bore seal in an electrical machine not only provides an economical, reliable, leak-proof way of excluding stator cooling fluid from the rotor cavity, but also permits a significant reduction (26%) in the weight of the electrical machine and a correspondingly substantial reduction in the size of the machine itself.

1 Claim, 3 Drawing Figures

ELASTOMERIC SEAL

STATEMENT OF GOVERNMENT INTEREST

The invention described herein may be manufactured and used by or for the Government for governmental purposes without the payment of any royalty thereon.

BACKGROUND OF THE INVENTION

This invention relates to the seal art and, more particularly, to a method of making an expansible seal and installing it on an assembly, such as an electrical machine.

Development of an ultra-light airborne alternator requires the machine to have a stator that is totally immersed in a circulating, dielectric cooling fluid. The fluid cannot be permitted to contact the 18,000 rpm motor, as the viscous losses would be extremely high. A conventional fiber/resin bore seal requires a 0.08" wall thickness, which is unacceptably thick.

Therefore, what is needed, and is not available in the prior art, is a thin-walled, leak-proof, bore seal which can be used over a wide temperature range, i.e., −65 degrees Fahrenheit to +400 degrees Fahrenheit.

SUMMARY OF THE INVENTION

This invention provides a method of making a seal that is useable as a bore seal and that fulfills the above-mentioned need. In addition, this invention provides a method of installing the seal in an assembly, such as an electrical machine having a bore and requiring a bore seal. Further, this invention eliminates the conventional problems of critical tolerances, of matching temperature expansion rates, and of thick sections to avoid buckling, that are associated with bore seals. The inventive method thereby constitutes a significant advance in the state-of-the-art.

By the use of the inventive method, a seal can be made that is useable as a bore seal and that has a thin wall (i.e., (0.025")). This thin-wall property permits a reduced air gap dimension between the stator and the rotor of an electrical machine. This, in turn, results in a very substantial reduction in weight of the machine (i.e., approximately 26 percent), because of better magnetic coupling between the rotor and the stator.

Accordingly, the principal object of this invention is to teach the fundamental and unique steps of the inventive method as adapted, for illustrative purposes, to a particular application.

Another object of this invention is to provide a thin-walled seal, that is useable as a bore seal, and that is leak-proof when positioned between the stator and the rotor cavity of an electrical machine.

Still another object of this invention is to provide a bore seal that permits a reduced air gap dimension.

Yet another object of this invention is to provide a bore seal that, when used in an electrical machine, will result in a much smaller, and much more efficient machine.

Still yet another object of this invention is to provide a seal that not only is useable as a bore seal, but that also is economical to make with low cost tooling.

Another object of this invention is to provide a seal that, in addition to being useable as a bore seal, also is expansible by way of inflation.

Still another object of this invention is to provide a quick and fail-safe method of installing the seal in a bore of an electrical machine.

Yet another object of this invention is to provide a method of installing the bore seal that does not require any specialized and/or technical knowledge on the part of the installer.

Still yet another object of this invention is to provide a seal that, as well as being useable as a bore seal, also can be reliably operated over a wide range of temperatures, e.g., −65 degrees Fahrenheit to +400 degrees Fahrenheit.

These objects of this invention, as well as other related objects thereof, will become readily apparent after a consideration of the description of the invention, together with reference to the contents of the Figures of the drawing.

Figure 1:
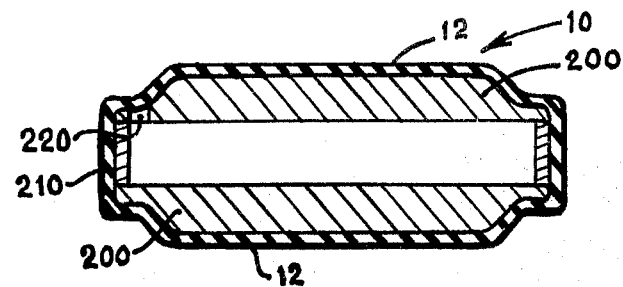
FIG. 1 is a side elevation view, in simplified schematic and pictorial form, of a preferred embodiment of the inventive seal, not expanded, and on a mold tool.

It is to be noted that the contents of the Figures of the drawing also shown, in their totality (i.e., cumulatively), the result of practicing the steps of our inventive method which will be described in detail later herein.

DETAILED DESCRIPTION OF THE INVENTIVE METHOD

Figure 2:
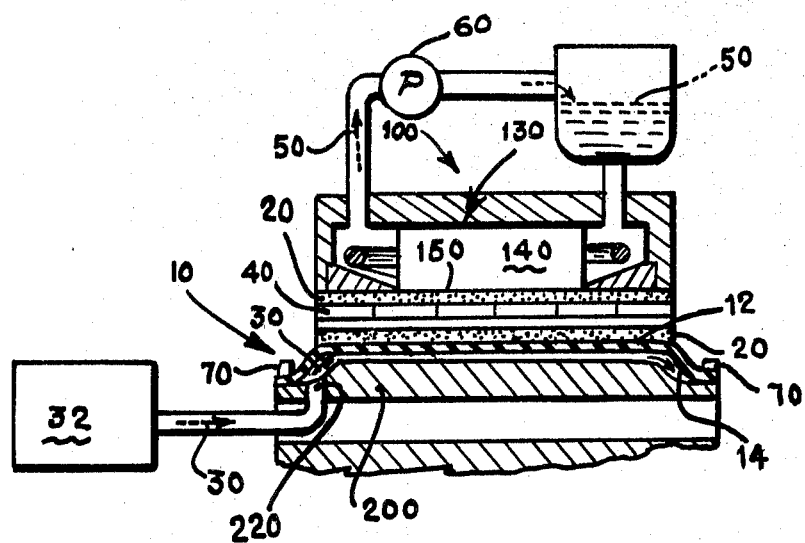
FIG. 2 is a side elevation view, in simplified schematic and pictorial form, and partially fragmented, of the seal being installed in an assembly.

As a preliminary matter, it is to be remembered that our inventive method is for use with an assembly (such as 100, FIGS. 2 and 3) and a rigid member or mold tool (such as 200, FIGS. 1 and 2).

Figure 3:
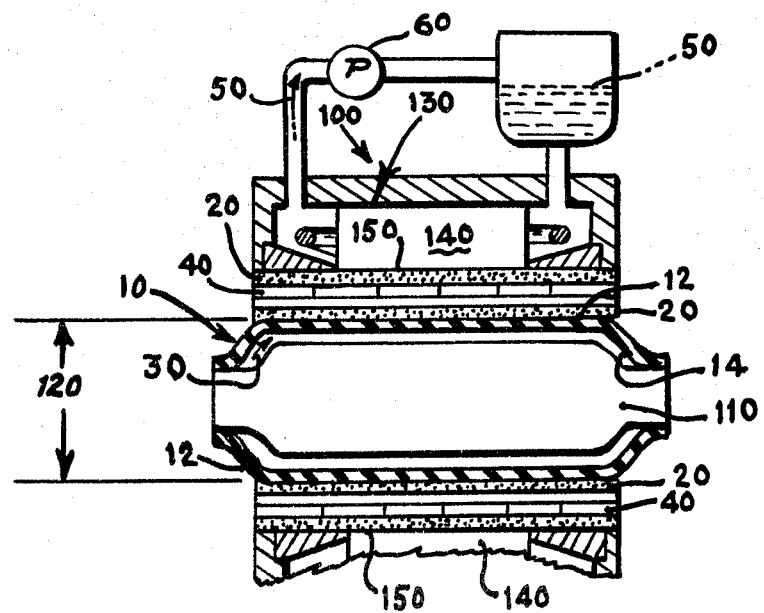
FIG. 3 is a side elevation view, in simplified schematic and pictorial form, and partially fragmented, of the seal in use, in its working environment, as a bore seal in an electrical machine.

Our inventive method encompasses two related processes, that is, a method of making the seal 10 (FIGS. 1-3, inclusive), and a method of installing the seal 10 in and/or on an assembly (such as electrical machine 100, FIGS. 2 and 3). It is here to be noted that the seal 10 is an expansible one.

As a matter of preference, our method of installing the seal 10 will be described first. Accordingly, reference is made to FIGS. 2 and 3.

Our preferred method of installing the expansible seal 10 in and/or on assembly 100 comprises, essentially, the below-listed steps.

Firstly, securing the seal 10, by suitable conventional means (such as clamps 70, FIG. 2) at opposite ends to a rigid member 200 (hereinafter referred to as the "mold tool").

Next, applying an adhesive 20 to the outer surface 12 of the seal 10 and to the stator bore surface 150 of the assembly 100 (i.e., the electrical machine).

Then, positioning the outer surface 12 of the seal 10 adjacent to the stator bore surface 150 of the electrical machine assembly 100.

Next, applying a gas 30 of sufficient pressure (e.g., from pressurized gas source 32) to the inner surface 14 of the seal 12 to cause the seal 12 to expand such that the adhesive-covered surfaces 12 and 150 of, respectively, the seal 10 and the assembly 100 come in contact.

Then, discontinuing the application of the gas 30 after a sufficient time has elapsed for the expanded seal 12 to become affixed to the assembly 100.

Next, removing the clamps 70, thereby releasing the mold tool 200 from the seal 10 which is affixed to, and thereby, is installed on, the assembly 100.

Lastly, trimming away and discarding the end portions of the seal 10 which are not adhered to assembly 100 (because they were clamped to tool 200).

It is to be noted that the above-described method may, and preferably does, include the additional steps of heating, and thereby curing, the adhesive 20 on the surface 12 of the seal 10 and on the surface 150 of assembly 100, before performing the above-mentioned step of discontinuing the application of the gas 30. This additional step of heating is performed preferably by using a heated oven.

It is also to be noted that the method may, and preferably does, include the further additional step of smoothing the surface 150 of the assembly 100 before performing the step of applying an adhesive 20 to the surface 150 of the assembly 100. This further additional step of smoothing the surface 150 is performed preferably by applying glass cloth 40 to the adhesive-covered surface 150. The glass cloth 40 is preferably in strips, and, the strips are each preferably 0.005 of an inch thick.

Now, with reference to FIGS. 1 and 2, our preferred method of making an expansible seal of elastomeric material, such as 10 which already has been described with reference to FIGS. 2 and 3, for use in and/or on assembly 100, FIG. 2, comprises essentially the below-listed steps.

Firstly, coating the mold tool 200, FIGS. 1 and 2, with a suitable release agent (such as "Teflon spray MS/22" which is commercially available from The Miller-Stephenson Chemical Co., Danbury, Conn.).

Then, dipping, withdrawing, inverting, dipping and withdrawing the mold tool 200, in repeated cycles, into and out of a solution of an elastomer (such as the fluorocarbon elastomer known in the art as "Viton A" which is commercially available from the E. I. DuPont Co., Wilmington, Delaware), until a desired uniform thickness of an elastomeric coating is obtained on the mold tool 200, and until the solvent remaining in the coating has evaporated.

Lastly, curing the elastomeric coating on the mold tool 200. Thereby, a final outer surface 12, FIGS. 1 and 2, is attained on the elastomeric coating; and, therefore, the elastomeric coating 10 on the mold tool 200 is functionally useable as an elastomeric seal.

It is to be noted that, as a matter of preference, the desired thickness of the elastomeric coating (i.e., the seal 10) is 0.025 of one inch.

It is also to be noted that the desired and attained elastomeric coating (i.e., seal 10) is capable of withstanding exposure to temperatures in the range of from approximately −65 degrees Fahrenheit to approximately +400 degrees Fahrenheit.

ADAPATION OF METHODS FOR PARTICULAR USE

It should be further realized within the scope of this invention that the methods described in detail above may also be combined (as a single method) in an appropriate situation in an adaptation for a particular use.

For example, and with reference to FIGS. 1-3, inclusive, if a method of making and installing an elastomeric bore seal for electrical machines (such as 100, FIGS. 2 and 3) having a rotor (such as 110, FIG. 3), a rotor cavity (such as 120, FIG. 2), and a stator assembly (such as 130, FIGS. 2 and 3) which includes a stator (such as 140, FIGS. 2 and 3) and a stator bore (such as 150, FIGS. 2 and 3), were to be needed, then the steps of the methods, in combination, could be used to achieve the desired result.

In such a case, the method would comprise the steps below-listed.

Firstly, obtaining a mold tool (such as 200, FIGS. 1 and 2) which is similar to the rotor 110 in diameter, but somewhat longer, generally.

Next, coating the mold tool 200 with a release agent, as previously described herein.

Then, dipping, withdrawing, inverting, dipping and withdrawing the mold tool 200, in repeated cycles, into and out of a solution of an elastomer (as previously described herein) that is dissolved in a solvent (as previously described herein), until a desired uniform thickness (i.e., 0.025 of an inch) of an elastomeric coating is obtained, and the solvent remaining in the coating has evaporated.

Next, curing the elastomeric coating, while still on the mold tool 200, FIG. 1, and thereby attaining a final outer surface 12 on the elastomeric coating.

Then, applying an adhesive 20 to the stator bore 150, FIG. 1.

Next, applying glass cloth 40, FIGS. 2 and 3, (preferably in a plurality of strips, with each strip being 0.005 of an inch thick) on the adhesive 20 on the stator bore 150, and thereby adhering the glass cloth (strips) 40 to the stator bore 150.

Then, applying an adhesive 20, FIGS. 2 and 3, to the final outer surface 12 of the cured elastomeric coating.

Next, placing the adhesive-covered elastomeric coating, with the mold tool 200 still therein, into the stator bore 150, FIG. 2.

Then, inflating with a pressurized gas 30, FIG. 2, and thereby expanding, the adhesive-covered elastomeric coating until the coating is lifted from the mold tool 200 and the coating is in uniform pressure contact with the glass cloth 40 that is covering the stator bore 150. Thereby, the coating covers the glass cloth 40 and the stator bore 150.

Next, heating, and thereby curing, the adhesive 20 on the stator bore 150 and the adhesive 20 on the outer surface of the elastomeric seal 10, FIGS. 2 and 3, thereby bonding the glass cloth 40 to the stator bore 150 and bonding the elastomeric seal 10 to the glass cloth 40, FIGS. 2 and 3. It is to be noted that this curing of the adhesive 20 is accomplished by heating the stator bore 150 (or, more accurately, the stator assembly 130 and the mold tool 200 with the inflated, adhesive-covered, elastomeric seal 10 on it) inside an oven, as previously indicated.

Then, removing the pressurized gas 30 and the mold tool 200 from within the elastomeric seal 10.

Next, inserting the rotor 110, FIG. 3, into the elastomeric seal-covered stator bore 150, FIG. 3.

Then, assembling the rotor 110, FIG. 3, into the elastomeric seal-covered stator bore 150, FIG. 3, such that the electrical machine 100, FIG. 3, is formed.

Lastly, cooling the stator 140, FIGS. 2 and 3, by circulating with a sucking action (such as with a positive displacement pump 60, FIGS. 2 and 3); a dielectric fluid 50 (such as "DC 200" which is commercially available from the Dow Corning Co., Midland, Michigan, or "Coolanol 20" which is commercially available from the Monsanto Co., St. Louis, Mo.) through the stator assembly 130, FIGS. 2 and 3. Thereby, the elastomeric seal 10 excludes the dielectric fluid 50 from the rotor cavity 120, FIG. 3, and the cooling effectuated by the circulating dielectric fluid 50 reduces loads on the adhesive bonds 20, FIG. 3.

It is here to be noted that, as a matter of preference, the mold tool 200, FIGS. 1 and 2, is hollow and has a closed, but openable, end 210 near which there is an opening 220 through which the pressurized gas 30, FIG. 2, is introduced under the inner surface 14 of the seal 10 to cause the seal 10 to expand while still on the mold tool 200.

It is also to be noted that, although the seal 10 is shown in FIGS. 1 and 2 as extending to, and covering, the ends of the mold tool 200, this is only by way of illustration, and need not occur, if not desired. However, if in fact the ends of the mold 200 are covered by the seal 10, then prior to inflating the seal 10 with the pressurized gas 30, that end of the seal 10 which covers the openable end 210 should be cut away to permit removal of the (removable) end cap thereat. Thereby, the closed end is opened, and the pressurized gas 30 is introduced through mold opening 220.

It is further to be noted that after the steps of heating, and thereby curing, the adhesive 20, FIG. 2, and of releasing the pressurized gas 30 from within the seal 10, FIG. 2, it is preferred that the ends of the seal 10 be trimmed to conform to the configuration of the stator bore 150.

DESCRIPTION OF THE PREFERRED EMBODIMENT

With reference to FIGS. 1-3, inclusive, therein is shown the preferred embodiment 10 of the inventive seal.

As can be seen from the contents of the Figures of the drawings, and as can be ascertained from the preceding descriptions of the inventive method, the inventive seal 10 is fluid-impervious, thin-walled (i.e., 0.025 of an inch thick), open-ended, and cylinder-like, and is made of an expansible material (e.g., an elastomeric material such as previously described herein) which can withstand a wide range of temperatures (i.e., from approximately $-65$ degrees Fahrenheit to approximately $+400$ degress Fahrenheit). The seal 10 is inflatable to conform to the configuration of whatever it is to adhere to (e.g., the stator bore 150, FIGS. 2 and 3). If the seal 10 is to be used in an electrical machine (such as 100, FIG. 3) having a rotor (such as 110, FIG. 3), then it is preferred that the internal surface 14 of the seal 10 conform to the requirements of the rotor.

MANNER OF USE OF THE PREFERRED EMBODIMENT

The manner of use, and of operation (i.e., function), of the preferred embodiment of the inventive seal 10, FIGS. 1-3, inclusive, can be easily ascertained by any person of ordinary skill in the art from the foregoing description, coupled with reference to the contents of the Figures of the drawing.

For others, it is sufficient to say that the manner of use and of operation of the seal 10 can best be understood by reading the description of the method(s) of making and installing the seal 10, as well as by reading the description of the structure of the seal 10 itself, and by closely examining the contents of the Figures of the drawing, particularly FIG. 3 thereof. The uniqueness of the seal 10 can best be appreciated by accepting the fact that its use provides not only an economical, reliable, leak-proof way of excluding stator cooling fluid 50, FIG. 3, from the rotor cavity 120, FIG. 3, but also permits a significant reduction (i.e., approximately 26 percent) in the weight of an electrical machine, and therefore, also permits a correspondingly substantial reduction in the size of the machine itself.

As a related matter, it is to be noted that the inversion of the mold tool during the dipping cycles results in a very uniform wall thickness in the finished seal. A uniform wall thickness allows a uniform expansion of the seal during the bonding procedure. This greatly enchances the bond integrity and thereby increases the seal life.

CONCLUSION

It is abundantly clear from all of the foregoing, and from the contents of the Figures of the drawing, that the stated objects, as well as related objects, of the invention have been achieved.

It is to be noted that, although there have been described and shown the fundamental and unique features of our inventive seal 10, as applied to a preferred embodiment adapted for use in a particular application (i.e., in use as a bore seal in an electrical machine in which there is a required separation of a cooling fluid between the stator and the rotor cavity) various other embodiments, variations, adaptations, substitutions, additions, omissions, and the like may occur to, and can be made by, those of ordinary skill in the art. For example, totally immersed pump motors, compressor motors, and fluid-cooled machines are other applications, as well as applications not involving electrical machines, i.e., in food and chemical processes.

Additionally, because of our teachings herein, it may occur to others of ordinary skill in the art that, in appropriate particular circumstances, the number of the basic and fundamental steps of our inventive method(s) can be increased, decreased, or otherwise varied, and/or that their sequence can be changed. In this regard it is to be noted that, in spite of any variations in the number or sequence of the steps of our method(s), the same desired results will be obtained, nevertheless.

What is claimed is:

1. The method of making and installing an elastomeric stator bore seal for electrical machines having a rotor, a rotor cavity, and a stator assembly which includes a stator and a stator bore, said method comprising the steps of:
   a. obtaining a rigid mold tool similar to said rotor in dimensions and longer in length than said rotor, wherein said rigid mold tool has an opening therin for use in permitting entry of a pressurized gas;
   b. coating said rigid mold tool with a release agent;
   c. dipping, withdrawing and inverting, and dipping, withdrawing and inverting said rigid mold tool, in repeated cycles, into and out of a solution of an elastomer dissolved in a solvent, until a thickness of approximately 0.025 of an inch of an elastomeric coating is obtained on said rigid mold tool and the solvent remaining in said coating has evaporated, wherein said elastomer used, and said elastomeric coating obtained, are capable of withstanding exposure to temperatures in the range of from approximately $-65$ degrees Fahrenheit to approximately $+400$ degrees Fahrenheit;

d. curing said elastomeric coating on said rigid mold tool, thereby attaining a final outer surface on said elastomeric coating;
e. applying an adhesive to said stator bore;
f. applying glass cloth to said adhesive stator bore, thereby adhering said glass cloth to said adhesive and to said stator bore;
g. applying an adhesive to said final outer surface of said cured elastomeric coating;
h. placing the adhesive-covered elastomeric coating, with said rigid mold tool therein, into said stator bore;
i. inflating with a pressurized gas introduced through said opening in said rigid mold tool, and thereby expanding, said adhesive-coated elastomeric coating until said coating is lifted from said mold rigid tool and said coating is in uniform pressure contact with said glass cloth covering said stator bore, with said coating thereby covering said glass cloth and said stator bore;
j. heating in a heating oven, and thereby curing, said adhesive on said stator bore and said adhesive on said outer surface of said elastomeric seal, thereby bonding said glass cloth to said stator bore and bonding said elastomeric seal to said glass cloth;
k. removing said pressurized gas and saaid rigid mold tool from within said elastomeric seal;
l. inserting said rotor into said elastomeric seal-covered stator bore;
m. assemblying said rotor and said elastomeric seal-covered stator bore, such that an electrical machine is formed; and
n. cooling said stator by circulating, with a sucking action, a dielectric fluid through said stator assembly, thereby said elastomeric seal excludes said dielectric fluid from said rotor cavity, and said cooling effected by said circulating dielectric fluid reduces loads on said adhesive bonds.

* * * * *